United States Patent
Oros et al.

(10) Patent No.: US 11,358,503 B1
(45) Date of Patent: Jun. 14, 2022

(54) SEAL FOR A TRIM MEMBER OF A VEHICLE SEAT BACK

(71) Applicant: Honda Motor Co., Ltd., Tokyo (JP)

(72) Inventors: Benjamin M. Oros, Dublin, OH (US); Carlington George Demetrius, Dublin, OH (US); Akira Miyazaki, Birmingham, MI (US); Yuichiro Umeda, Novi, MI (US); Hiroaki Taniguchi, Tochigi (JP); Yoshiaki Ikeda, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/208,727

(22) Filed: Mar. 22, 2021

(51) Int. Cl.
  *B60R 5/04* (2006.01)
  *B60N 2/58* (2006.01)

(52) U.S. Cl.
  CPC ......... *B60N 2/5891* (2013.01); *B60N 2/5825* (2013.01); *B60R 5/044* (2013.01)

(58) Field of Classification Search
  CPC ............................ B60N 2/5825; B60N 2/5891
  See application file for complete search history.

(56) References Cited

U.S. PATENT DOCUMENTS

| | | | |
|---|---|---|---|
| 4,848,826 A | 7/1989 | Kuwabara et al. | |
| 5,658,046 A | 8/1997 | Rus | |
| 6,565,138 B2 | 5/2003 | Sparrer | |
| 6,702,355 B1 * | 3/2004 | Price | B60R 5/045 296/37.16 |
| 7,080,867 B2 | 7/2006 | Woerner et al. | |
| 7,216,916 B2 * | 5/2007 | Czerwinski | B60N 2/06 296/24.43 |
| 7,306,840 B2 | 12/2007 | Brade-Scholz et al. | |
| 7,396,063 B2 * | 7/2008 | Warsi | B60R 5/044 296/191 |
| 9,725,043 B2 * | 8/2017 | Prezecki, II | B60R 5/047 |
| 9,902,330 B2 * | 2/2018 | Fujii | B60R 5/047 |
| 9,963,077 B1 * | 5/2018 | Wu | B60R 5/045 |
| 9,981,579 B2 | 5/2018 | Watanabe et al. | |
| 2006/0180623 A1 | 8/2006 | Reynolds | |
| 2015/0118437 A1 | 4/2015 | Schulze et al. | |
| 2018/0272953 A1 | 9/2018 | Jeon et al. | |

FOREIGN PATENT DOCUMENTS

| | | |
|---|---|---|
| CN | 101791882 A1 | 8/2010 |
| CN | 210011680 U | 2/2020 |
| DE | 102006021720 A1 | 11/2007 |
| EP | 1439093 A1 | 7/2004 |
| EP | 1498304 A2 | 1/2005 |
| EP | 1854657 A2 | 11/2007 |

(Continued)

*Primary Examiner* — Shin H Kim
(74) *Attorney, Agent, or Firm* — Mark E. Duell; American Honda Motor Co., Inc.

(57) ABSTRACT

A seal for sealing a gap between a seat back of a seat in a vehicle, the seat back including a fabric construction, and a shelf located adjacent the seat back includes a trim member laterally spanning from a first distal end of an engagement edge of the shelf that engages with the seat back of the seat to a second distal end of the engagement edge of the shelf. The trim member includes a seal member laterally spanning and attached to the trim member that engages with the seat back. The seal member is constructed of an unwoven fabric material.

17 Claims, 7 Drawing Sheets

(56) References Cited

FOREIGN PATENT DOCUMENTS

| | | |
|---|---|---|
| EP | 2070766 A1 | 6/2009 |
| FR | 2896740 B1 | 8/2009 |
| JP | 6267000 B2 | 1/2018 |
| KR | 200359759 Y1 | 8/2004 |
| WO | WO2020148147 A1 | 7/2020 |

* cited by examiner

SEAL FOR A TRIM MEMBER OF A VEHICLE SEAT BACK

TECHNICAL FIELD

The embodiments disclosed herein relate to seals in vehicles, and more specifically to seals between seats and trim members.

BACKGROUND

There exists a need to identify a novel way of sealing a gap between the front and rear seats of a vehicle, such as an autonomous vehicle, to their respective front and rear shelf trim panels. Typical vehicle construction teaches to use a clip structure or foam seal. However, due to the frequency of service in an autonomous vehicle, these traditional methods are not an option.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

According to one aspect, a seal for sealing a gap between a seat back of a seat in a vehicle constructed of fabric and a shelf located adjacent the seat back includes a trim member laterally spanning from a first distal end of an engagement edge of the shelf that engages with the seat back of the seat to a second distal end of the engagement edge of the shelf, and a seal member laterally spanning and attached to the trim member that engages with the seat back, and wherein the seal member is constructed of an unwoven fabric material.

According to another aspect, a vehicle includes a seat, the seat including a seat back constructed of fabric, a shelf located adjacent the seat back, a trim member laterally spanning from a first distal end of an engagement edge of the shelf that engages with the seat back of the seat to a second distal end of the engagement edge of the shelf, and a seal member laterally spanning and attached to the trim member that engages with the seat back, and wherein the seal member is constructed of an unwoven fabric material.

According to yet another aspect, a shelf in a vehicle, the shelf being located adjacent to a seat back of seat in the vehicle constructed of fabric, the shelf includes a seal for sealing a gap between the seat back of the seat and the shelf located adjacent the seat back. The seal includes a trim member laterally spanning from a first distal end of an engagement edge of the shelf that engages with the seat back of the seat to a second distal end of the engagement edge of the shelf, and a seal member laterally spanning and attached to the trim member that engages with the seat back, and wherein the seal member is constructed of an unwoven fabric material.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
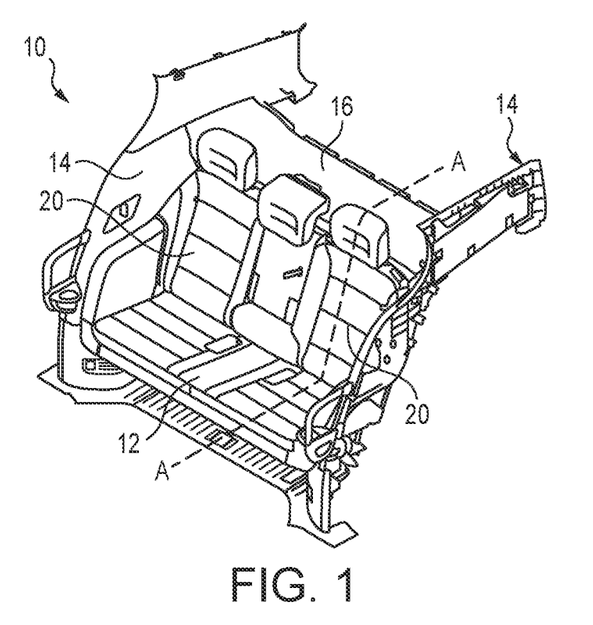
FIG. 1 is a perspective view of a portion of an interior of a vehicle.

FIG. 1 is a portion of an interior of a vehicle 10 illustrating a seat assembly 12, interior panels 14 defining the interior walls of the vehicle 10, and a shelf 16 located immediately behind the seat assembly 12. The shelf 16, which is a trim piece, may be made of polypropylene, thermoplastic olefin (TPO), or any other suitable material. The shelf may also be constructed with a covering of unwoven fabric material or any other suitable material that prevents items placed on the shelf 16 during the operation of the vehicle 10 for storage. The vehicle 10 may be a traditional motor vehicle, a hybrid electric vehicle, electric vehicle, or autonomously operated electric vehicle. Additionally, particularly in the case where the vehicle 10 is an autonomously operated vehicle, the seat assembly 12 may be forward facing, where the shelf 16 is longitudinally rearward of the seat assembly 12, or the seat assembly 12 may be rearward facing, where the shelf 16 is longitudinally forward of the seat assembly 12.

Figure 2:
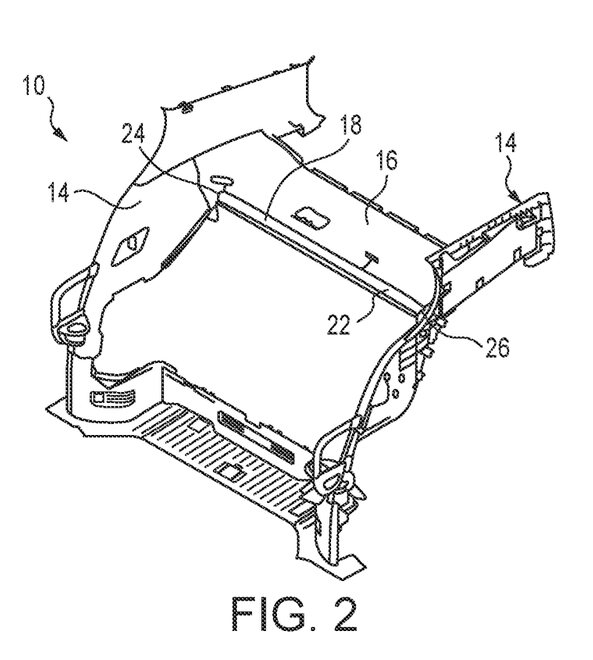
FIG. 2 is a perspective view of the portion of the interior of the vehicle of FIG. 1 with the seats removed.

FIG. 2 illustrates the portion of the interior of the vehicle 10 with the seat assembly 12 removed. An engagement edge 18 of the shelf 16 that engages a seat back 20 (see FIG. 1) of the seat assembly 12 includes a seal 22 that spans laterally from a first distal end 24 of the engagement edge 18 to a second distal end 26 of the engagement edge 18 opposite the first distal end 24. In the past, seal 22 would typically include a clip structure or foam seal. However, due to the frequency of serviceability of autonomously operated electric vehicles, these traditional methods are not an option. FIGS. 3-9 illustrate the seal 22 according to the presented embodiments.

Figure 3:
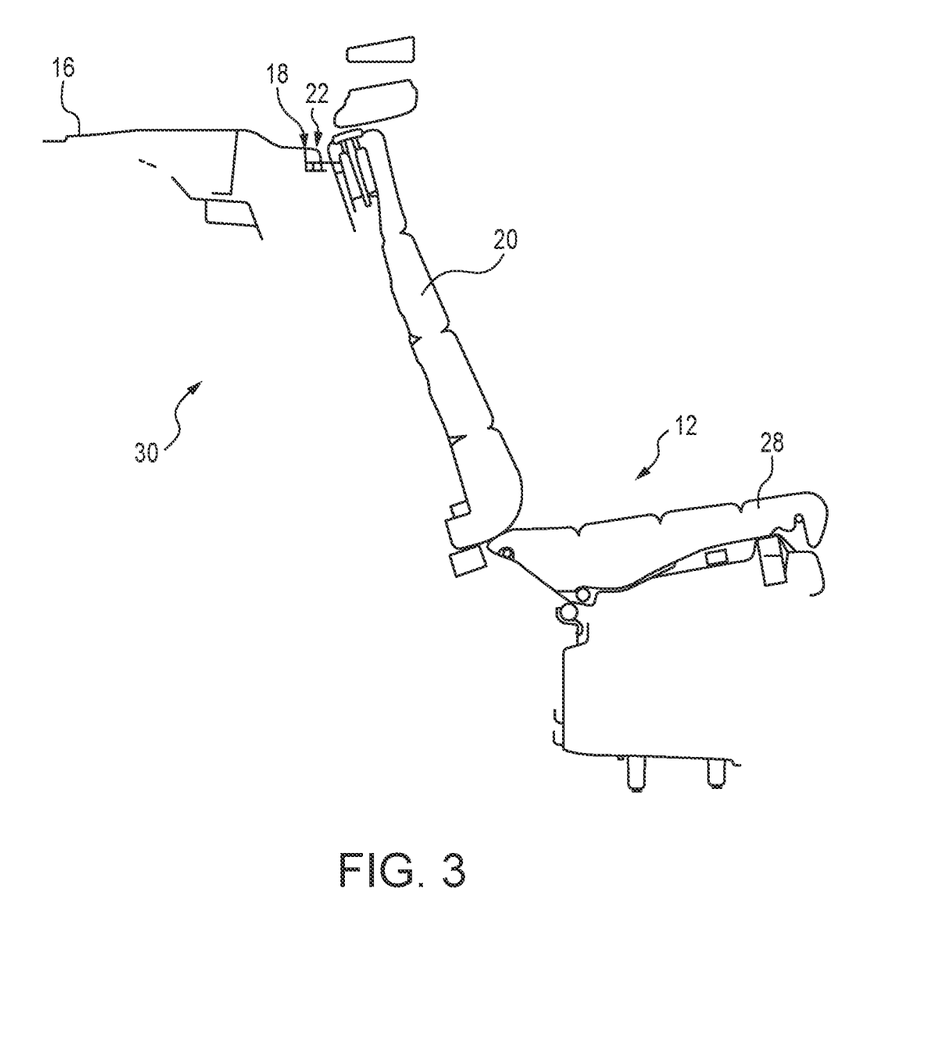
FIG. 3 is a cross-section of FIG. 1 along line A-A.

FIG. 3 is a cross-section along line A-A of FIG. 1 and illustrates the relationship between the seat assembly 12 and the shelf 16. The seat assembly 12 is located in front of the shelf 16, but the seat assembly 12 and the shelf 16 are not physically attached to one another. The arrangement allows the seat back 20 of the seat assembly 12 to be folded up and down, into contact with the seat cushion 28, to provide access to a service compartment 30 located behind the seat back 20.

Figure 4:
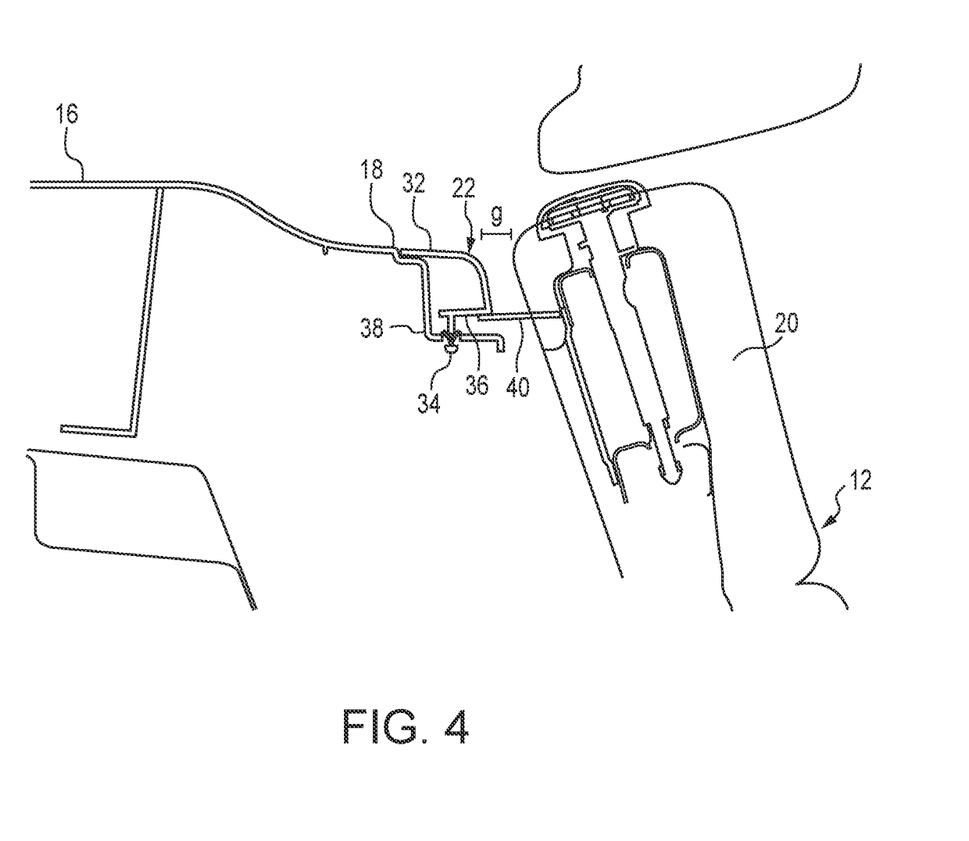
FIG. 4 is a closeup side view of a seat back, seal, and shelf of a vehicle.

Therefore, with reference to FIG. 4, the seal 22 located along the engagement edge 18 of the shelf 16 is designed to close a gap g located between the shelf 16 and seat back 20. The gap g may range from 0.0 mm (i.e. contact) to 15.0 mm, and the seal 22 must be flexible to cover the gap g for all gaps in the range.

The seal 22 may include a trim member 32 that spans laterally from a first distal end 24 of an engagement edge 18 of the shelf 16 that engages with the seat back 20 of the seat assembly 12 to the second distal end 26 of the engagement edge 18 of the shelf 16. The trim member 32 is constructed of a suitable plastic material, such as PP or TPO. The trim member 32 may be attached to shelf 16 by any suitable method, such as clips 34 formed in rib portions 36 of the trim member 32 that attach to the mating portions 38 of the shelf.

The seal 22 may further include a seal member 40 that laterally spans the trim member 32, is attached to the trim member 32, and engages with the seat back 20. The seal member 40 may be a needle-punched unwoven fabric material, which provides flexibility in sealing variable gaps g as described above.

Figure 5:
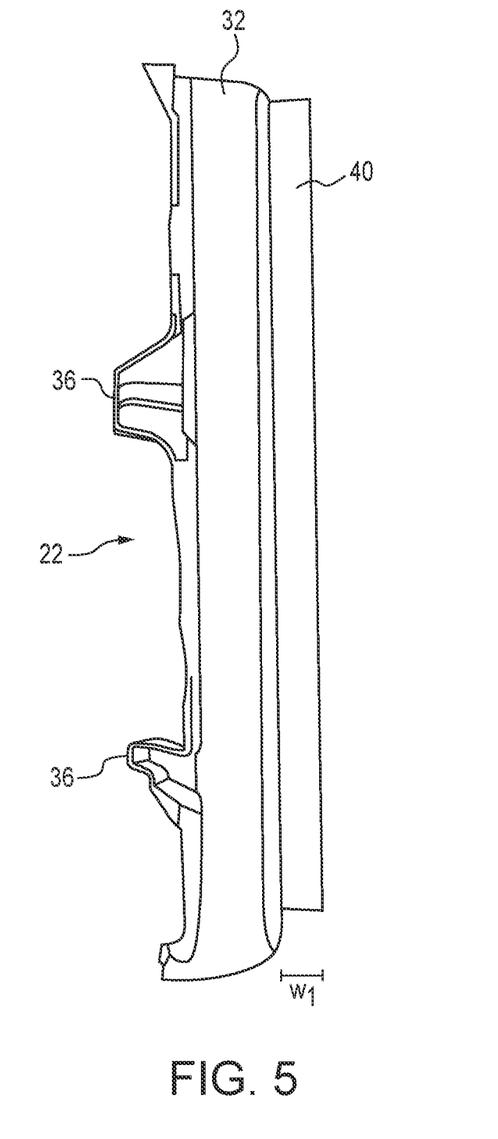
FIG. 5 is a top view of the seal illustrated in FIG. 4.

FIG. 5 shows a top view of the seal 22. The seal member 40 may extend outward from the trim member 32 a width $w_1$ approximately 15.0 mm, which is the length necessary to bridge the upper range of the gap g, although the width $w_1$ may extend any length necessary.

Figure 6:
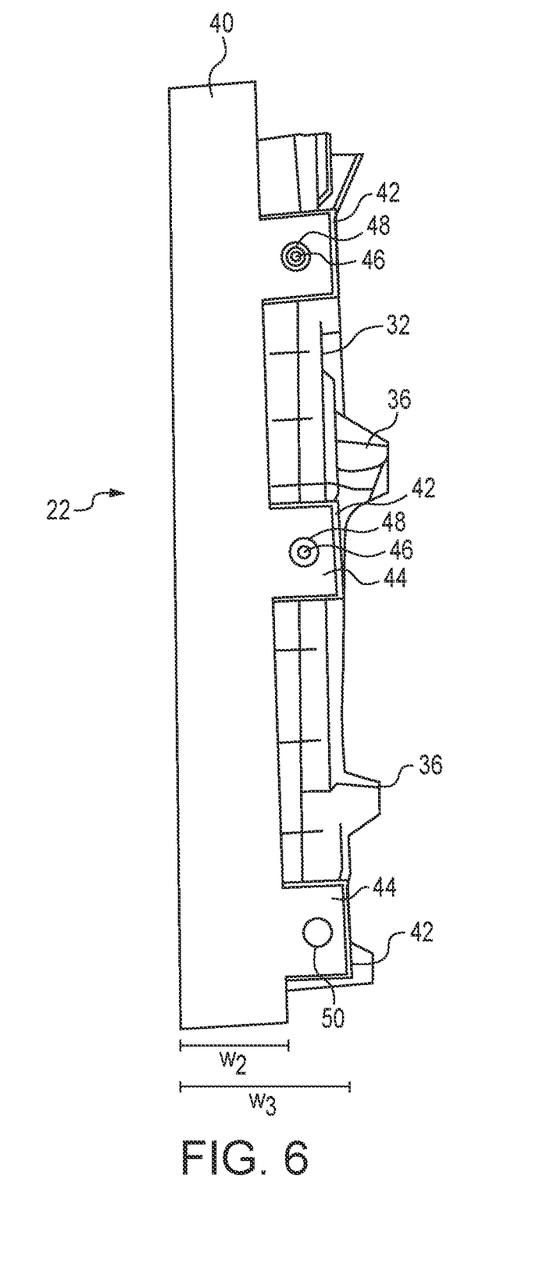
FIG. 6 is a bottom view of the seal illustrated in FIGS. 4-5.

FIG. 6 illustrates a bottom view of the seal 22. The bottom view of the seal is hidden from view of users of the vehicle 10 when the vehicle 10 is in use and the seal 22 is installed. The trim member 32 includes a plurality of tabs 42 and the seal member 40 includes a plurality of seal tabs 44, where each one of the plurality of seal tabs 44 corresponds to one each of the plurality of tabs 42 on the trim member 32. The seal tabs 44 are attached to the tabs 42 to form the seal 22.

In one embodiment, each of the tabs 42 include a pin 46 constructed from polypropylene that extends from the tab 42. Each of the seal tabs 44 include a hole 48 into which the respective pin 46 is disposed. To complete the attachment, the pin 46 is vibration welded to create a cap 50 that secures the seal tabs 44 to the tabs 42.

In an alternate embodiment, each seal tab 44 may be attached to a respective tab 42 with a suitable adhesive, selected from a group known to those skilled in the art.

Figure 7:
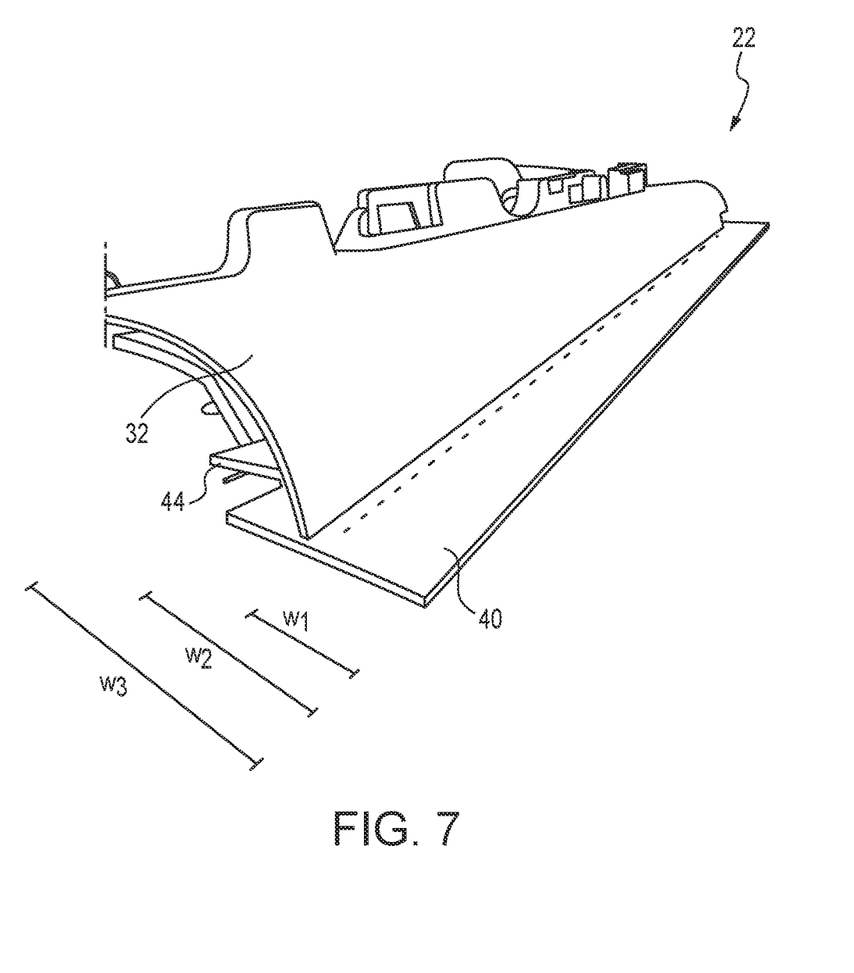
FIG. 7 is a perspective view of the seal illustrated in FIGS. 4-6.

Also illustrated in FIGS. 6-7, the width $w_1$ of the seal member 40, as stated, extending from the trim member 32 is approximately 15.0 mm. The width $w_2$ of the seal member 40 overall is approximately 45.0 mm. The width $w_3$ of the seal member 40 including the seal tabs 44 is approximately 60.0 mm.

Figure 8:
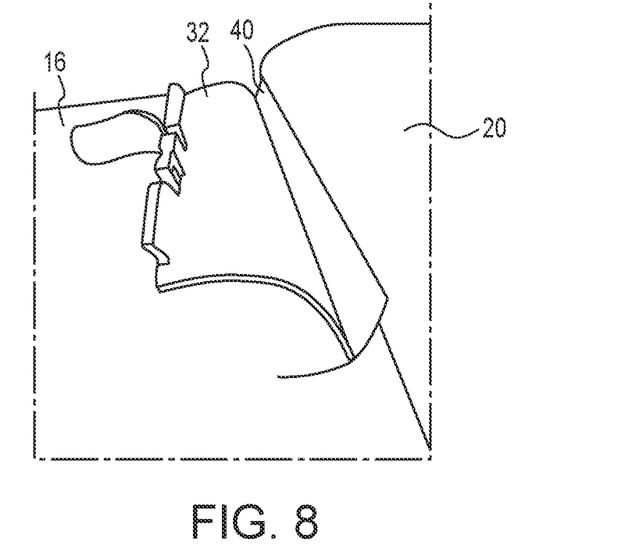
FIG. 8 is a side view of a seal sealing a nominal gap between the seat back and the shelf.
Figure 9:
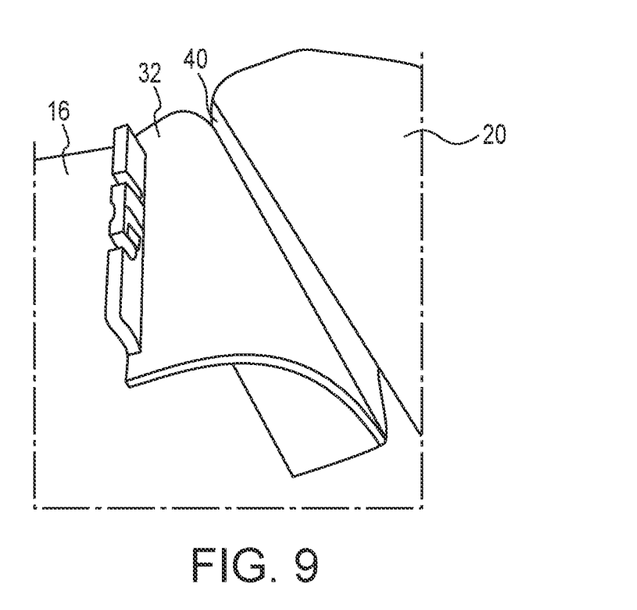
FIG. 9 is a side view of a seal sealing a narrow gap between the seat back and the shelf.

FIGS. 8-9 illustrate the arrangement of the seal member 40 to seal a gap g of varying lengths. FIG. 8 illustrates the seal member 40 sealing a nominal gap g of approximately 11.0 mm. As the gap g is greater than the median 7.5 mm, the seal member 40 is not required to fold up against the trim member 32 and remains extended. FIG. 9 illustrates a narrow gap g of approximately 3.0 mm between the seat back 20 and shelf 16. The seal member 40 folds near the trim member 32 to fit into the gap g.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A seal for sealing a gap between a seat back of a seat in a vehicle comprising fabric and a shelf located adjacent the seat back, comprising:
    a trim member laterally spanning from a first distal end of an engagement edge of the shelf that engages with the seat back of the seat to a second distal end of the engagement edge of the shelf, wherein the trim member further comprises a plurality of tabs, wherein each of the plurality of tabs have a pin extending from a surface of the tab; and
    a seal member laterally spanning and attached to the trim member that engages with the seat back; and
    wherein the seal member comprises unwoven fabric material.

2. The seal of claim 1 wherein the seal member further comprises:
    a plurality of seal tabs, each of the plurality of seal tabs corresponding to each of the plurality of tabs on the trim member and including a hole for receiving the pin of each of the tabs.

3. The seal of claim 2 wherein each pin on the plurality of seal tabs is vibration welded to secure the seal member to the trim member.

4. The seal of claim 3 wherein the trim member comprises polypropylene.

5. The seal of claim 1 wherein the seal member extends between 10.0 and 20.0 mm from an edge of the trim member for sealing the gap between the seat back and the shelf.

6. The seal of claim 5 wherein the seal member extends 15 mm from the edge of the trim member.

7. The seal of claim 4 wherein the seal member has a thickness between 1.0 mm and 4.0 mm.

8. The seal of claim 7 wherein the thickness of the seal member is 2.0 mm.

9. A seal for sealing a gap between a seat back of a seat in a vehicle comprising fabric and a shelf located adjacent the seat back, comprising:
    a trim member laterally spanning from a first distal end of an engagement edge of the shelf that engages with the seat back of the seat to a second distal end of the engagement edge of the shelf, wherein the trim member further comprises a plurality of tabs; and
    a seal member laterally spanning and attached to the trim member that engages with the seat back; and
    wherein the seal member comprises unwoven fabric material.

10. The seal of claim 9 wherein the seal member further comprises:
    a plurality of seal tabs, each of the plurality of seal tabs corresponding to each of the plurality of tabs on the trim member.

11. The seal of claim 10 wherein each seal tab is attached to a tab by an adhesive.

12. A vehicle, comprising:
    a seat, the seat including a seat back comprising fabric;
    a shelf located adjacent the seat back,
    a trim member laterally spanning from a first distal end of an engagement edge of the shelf that engages with the seat back of the seat to a second distal end of the engagement edge of the shelf, wherein the trim member further comprises a plurality of tabs, wherein each of the plurality of tabs has a pin extending from a surface of the tab; and a seal member laterally spanning and attached to the trim member that engages with the seat back; and wherein the seal member comprises unwoven fabric material.

13. The vehicle of claim 12 wherein the seal member further comprises:

a plurality of seal tabs, each of the plurality of seal tabs corresponding to each of the plurality of tabs on the trim member and including a hole for receiving the pin of each of the tabs.

14. The vehicle of claim 13 wherein each pin on the plurality of seal tabs is vibration welded to secure the seal member to the trim member.

15. A shelf in a vehicle, the shelf being located adjacent to a seat back of seat in the vehicle comprising fabric, the shelf comprising:

a seal for sealing a gap between the seat back of the seat and the shelf located adjacent the seat back, the seal comprising:

a trim member laterally spanning from a first distal end of an engagement edge of the shelf that engages with the seat back of the seat to a second distal end of the engagement edge of the shelf, wherein the trim member further comprises a plurality of tabs, wherein each of the plurality of tabs have a pin extending from a surface of the tab; and a seal member laterally spanning and attached to the trim member that engages with the seat back; and wherein the seal member comprises unwoven fabric material.

16. The shelf of claim 15 wherein the seal member further comprises:

a plurality of seal tabs, each of the plurality of seal tabs corresponding to each of the plurality of tabs on the trim member and including a hole for receiving the pin of each of the tabs.

17. The vehicle of claim 16 wherein each pin on the plurality of seal tabs is vibration welded to secure the seal member to the trim member.

* * * * *